US008676620B2

(12) United States Patent
Hunt et al.

(10) Patent No.: US 8,676,620 B2
(45) Date of Patent: Mar. 18, 2014

(54) SYSTEM AND METHOD FOR WORKORDER MANAGEMENT

(75) Inventors: Aaron Dale Hunt, Bellefonte, PA (US); Jeffrey Allen Dearborn, Southaven, MS (US)

(73) Assignee: AgJunction LLC, Hiawatha, KS (US)

( * ) Notice: Subject to any disclaimer, the term of this patent is extended or adjusted under 35 U.S.C. 154(b) by 0 days.

(21) Appl. No.: 13/117,369

(22) Filed: May 27, 2011

(65) Prior Publication Data

US 2011/0295638 A1   Dec. 1, 2011

Related U.S. Application Data

(60) Provisional application No. 61/349,695, filed on May 28, 2010, provisional application No. 61/349,703, filed on May 28, 2010, provisional application No. 61/349,707, filed on May 28, 2010.

(51) Int. Cl.
   *G06Q 40/00*   (2012.01)

(52) U.S. Cl.
   USPC ............................ 705/7.11; 705/7.42

(58) Field of Classification Search
   USPC .............................. 705/7.11–7.42
   See application file for complete search history.

(56) References Cited

U.S. PATENT DOCUMENTS

| | | | | |
|---|---|---|---|---|
| 5,919,242 A | * | 7/1999 | Greatline et al. | 701/50 |
| 6,141,614 A | * | 10/2000 | Janzen et al. | 701/50 |
| 6,236,924 B1 | * | 5/2001 | Motz et al. | 701/50 |
| 7,346,531 B2 | * | 3/2008 | Jacobs | 705/7.15 |
| 7,624,033 B1 | * | 11/2009 | Jean et al. | 705/7.26 |
| 2002/0111842 A1 | * | 8/2002 | Miles | 705/8 |
| 2003/0158770 A1 | * | 8/2003 | Carlson et al. | 705/9 |
| 2003/0208319 A1 | | 11/2003 | Ell et al. | |
| 2005/0192752 A1 | | 9/2005 | Rooney et al. | |
| 2006/0213167 A1 | * | 9/2006 | Koselka et al. | 56/10.2 A |
| 2007/0233533 A1 | * | 10/2007 | Xie et al. | 705/7 |
| 2009/0164054 A1 | | 6/2009 | Peterson et al. | |
| 2009/0216594 A1 | * | 8/2009 | Verhey et al. | 705/8 |
| 2010/0036696 A1 | * | 2/2010 | Lang et al. | 705/7 |
| 2011/0295500 A1 | * | 12/2011 | Hunt et al. | 701/201 |
| 2011/0295638 A1 | * | 12/2011 | Hunt et al. | 705/7.15 |

FOREIGN PATENT DOCUMENTS

| WO | WO-0004341 | 1/2000 |
|---|---|---|
| WO | WO-0058801 | 10/2000 |

* cited by examiner

*Primary Examiner* — Thomas Dixon
*Assistant Examiner* — Benjamin S Fields
(74) *Attorney, Agent, or Firm* — Law Office of Mark Brown, LLC; Mark E. Brown; Christopher M. DeBacker

(57) ABSTRACT

A system and method for managing workorders from a single location is provided. The system includes functionality to create workorders, to transmit workorders to equipment at a job site, e.g., an agricultural field, and to log the results of a completed workorder.

7 Claims, 4 Drawing Sheets

SYSTEM AND METHOD FOR WORKORDER MANAGEMENT

CROSS-REFERENCE TO RELATED APPLICATIONS

This application claims the benefit of U.S. Provisional Application No. 61/349,695, entitled "SYSTEM AND METHOD FOR WORKORDER MANAGEMENT," filed May 28, 2010, U.S. Provisional Application No. 61/349,703, entitled "SYSTEM AND METHOD FOR COLLECTING AND PROCESSING AGRICULTURAL FIELD DATA," filed May 28, 2010, and U.S. Provisional Application No. 61/349,707, entitled "REMOTE MANAGEMENT SYSTEM FOR EQUIPMENT," filed May 28, 2010, which applications are hereby incorporated by reference in their entirety.

BACKGROUND

The application generally relates to managing workorders. The application relates more specifically to a system and method for managing the creation, transfer, execution and subsequent reporting of completion of workorders for equipment at a remote location.

Previously, when a user wanted to create a workorder for actions at a particular job site, the user had to create the workorder, i.e., manually or by computer, and then make arrangements for the workorder to be provided to the job site. The user could directly provide the workorder to the equipment operator, which would require the user and operator to be at the same location. If the user was not at the same location as the operator, the user would have to transmit the information to the operator by phone or other communication technique, which transmission process could be time consuming and lead to errors being introduced into the workorder. Further, once the workorder was completed, information regarding the completion of the workorder had to be sent back to the user using the same time consuming and error prone techniques. In addition, the user had no way to monitor the progress of the equipment in completing the workorder.

Therefore, what is needed is a system and method that can manage workorders from a single location including the sending of workorders to the job site, the monitoring of workorders in progress and the receipt of information from the job site regarding completed workorders.

SUMMARY

The present application is directed to a method for managing workorders. The method includes creating a workorder for a predetermined location on a first computer. The workorder includes at least one action to be completed at the predetermined location by a predetermined piece of equipment. The method further includes transmitting the workorder from the first computer to a second computer separate from the first computer. The second computer is associated with at least one of the predetermined piece of equipment or an operator of the predetermined piece of equipment. The method also includes performing the at least one action from the workorder with the predetermined piece of equipment, storing log data associated with the performance of the at least one action in the second computer, and transmitting the stored log data and an indication of completion of the workorder from the second computer to the first computer.

The present application is further directed to a system having a first computer and a piece of equipment at a remote location from the first computer. The piece of equipment includes a second computer. The system also has a workorder management system. The workorder management system includes a first computer algorithm executable by a microprocessor from the first computer and a second computer algorithm executable by a microprocessor from the second computer. The first computer algorithm is configured to permit a user to create a workorder for the piece of equipment and transmit the workorder to the second computer with the piece of equipment. The second computer algorithm is configured to permit an operator to retrieve the transmitted workorder from the first computer, integrate additional information into the transmitted workorder and transmit information on the completed work order to the first computer.

One advantage of the present application is improved efficiency in the execution of workorders by equipment and the people/operators handling the equipment.

Another advantage of the present application is significant cost savings in time and resources from more efficient handling of workorders.

Still another advantage of the present application is the ability to verify data collection and workorder execution.

Yet another advantage of the present application is better and more accurate reporting capabilities regarding workorder actions to comply with governmental requirements.

A further advantage of the present application is a reduction in the misapplication of materials or misuse of machines or equipment and the corresponding liability associated with such misapplication or misuse due to more accurate and efficient workorder handling.

Other features and advantages of the present application will be apparent from the following more detailed description of the preferred embodiment, taken in conjunction with the accompanying drawings which illustrate, by way of example, the principles of the application.

BRIEF DESCRIPTION OF THE DRAWINGS

Wherever possible, the same reference numbers are used throughout the drawings to refer to the same or like parts.

DETAILED DESCRIPTION OF THE EXEMPLARY EMBODIMENTS

Figure 1:
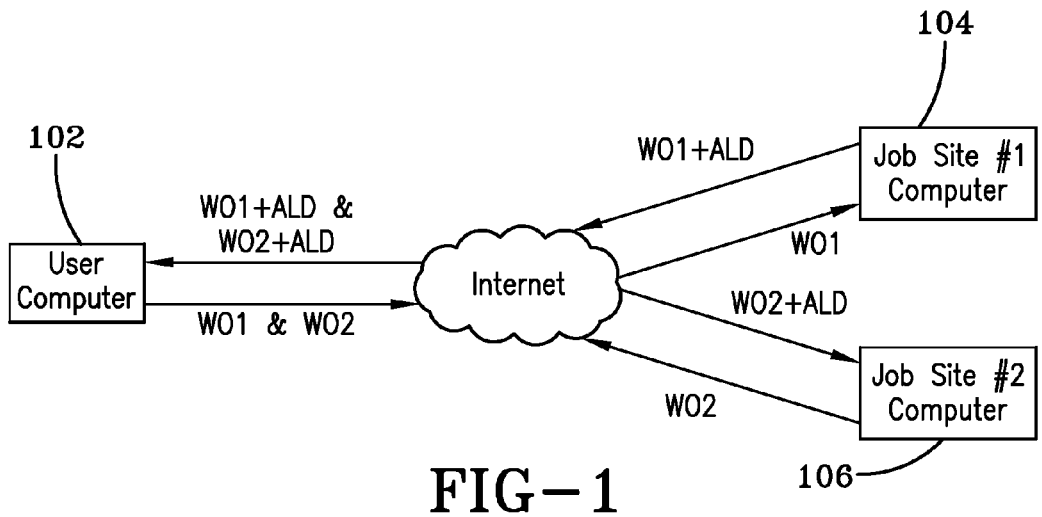
FIG. 1 shows schematically the transmission of workorder information between a user and multiple job sites in an exemplary embodiment.

The present application is directed to a system and method for managing workorders from a single location using a workorder management system. The system includes functionality to create workorders, to transmit workorders to equipment and/or operators at a job site, e.g., an agricultural field, and to log the results of a completed workorder. In an exemplary embodiment, the system can be an "online system" that is accessible over the Internet or other similar type of computer network. The use of the Internet or other type of computer network permits the transfer, i.e., the sending and/or receiving, of information between users, operators and/or the pieces of equipment without the users, operators and/or pieces of equipment having to be in close proximity to each other. In addition, since the system uses the Internet to transfer information, access to the system can occur with any device that includes Internet connection functionality, e.g., network cards, wireless modems, transceivers, etc., and display software, e.g., a web browser. Some examples of devices a user or operator can use to access the system are desktop computers, laptop computers, tablet computers, net books, handheld devices, e.g., "smart" phones, and other similar devices. The user or operator may be required to enter personally identifiable information, e.g., a user name and password, to permit the system to identify the user or operator. Once the user or operator is identified by the system, the system can retrieve a profile for the person that can include information on particular workorders and/or locations and corresponding preference information. After gaining access to the system, a user or operator is provided with a web page or other similar type of file that provides information on a particular workorder and/or location that has been selected by a user.

In one exemplary embodiment, the workorder management system is used in the agricultural industry to manage actions or tasks required in agricultural fields or other agricultural locations. The workorder management system can be included in or be a part of a larger agricultural management system. However, in other embodiments, the workorder management system can be a stand-alone application that operates separate from other agricultural management systems. If the workorder management system is separate from other agricultural management systems, the workorder management system can be in communication with the other agricultural management systems to exchange data as required.

In one embodiment, the workorder management system can be computer programs, algorithms or software stored in the non-volatile memory of corresponding computers or computing devices accessible by the user or operator or associated with the piece of equipment. The computer programs, algorithms or software can have a series of instructions executable by a corresponding microprocessor of the computer or computing device. While the workorder management system can be embodied in a computer program(s) and executed by microprocessor, it will be understood by those skilled in the art that the workorder management system may have some functions implemented and executed using digital and/or analog hardware, especially on the computer or computing device associate with the piece of equipment. The workorder management system also includes user interfaces accessible by the user and the operator. The operator can access the workorder management system from either the operator's own computer or through the computer associated with the piece of equipment.

FIG. 1 shows an embodiment of the transmission of workorder information between a user and multiple job sites using the workorder management system of the present application. In the exemplary embodiment shown in FIG. 1, a user can develop or prepare a first workorder (WO1) for job site #1 and a second workorder (WO2) for job site #2 using a corresponding user computer 102. As the workorders WO1 and WO2 are completed, the user computer 102 can transmit the corresponding workorders over the Internet to equipment and/or operators at the corresponding job sites, i.e., the first workorder WO1 is transmitted to the job site #1 computer 104 (the equipment computer and/or operator computer 104 associated with job site #1), and the second workorder WO2 is transmitted to the job site #2 computer 106 (the equipment computer and/or operator computer associated with job site #2). As the corresponding workorders are completed at the job sites, the workorder and associated application log data (ALD) relating to the completion of the workorder are transmitted back to the user computer 102 by the job site #1 computer 104 and the jobsite #2 computer 106 for review by the user.

Figure 2:
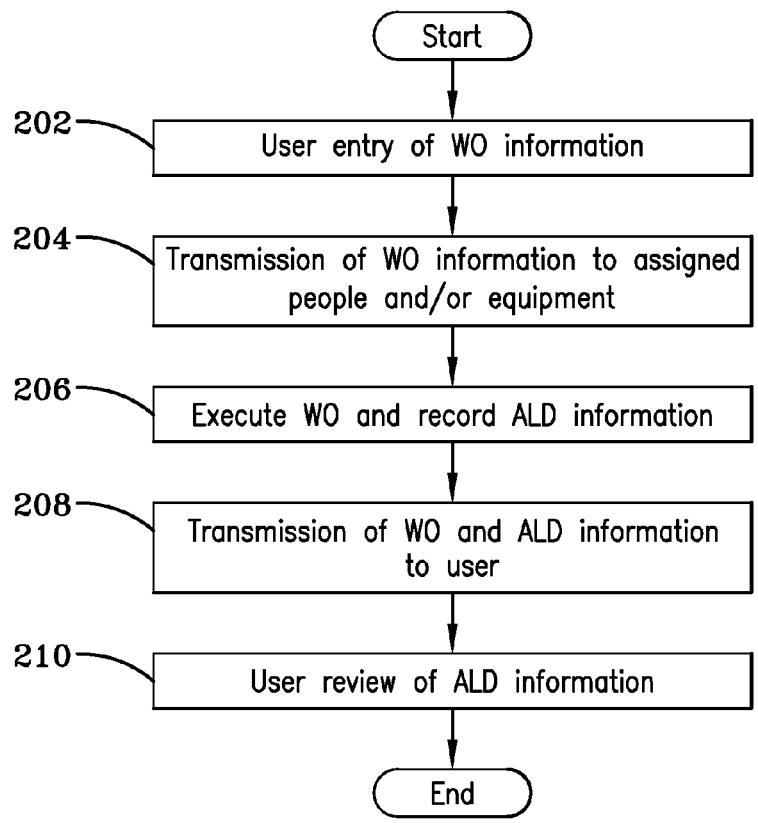
FIG. 2 shows a flowchart of the process for the handling of workorders in one exemplary embodiment.

FIG. 2 shows an exemplary embodiment of a process for the handling of a workorder (WO) for a particular job site, field or location. The process begins by a user entering a workorder into the system (step 202). When entering a workorder into the system, the user can select: a predetermined or predefined field or location; a predetermined or predefined task or action to be performed at the selected predefined field or location; and the corresponding equipment and/or operators to perform the selected predefined task or action at the selected predefined field or location. In one exemplary embodiment, a user can only create workorders for defined fields or locations as shown on a computer generated or displayed map, i.e., the fields or locations are defined by boundary indicators shown on the computer generated or displayed map. In other words, a user cannot create a workorder for a field or location that does not have a defined boundary on the computer generated or displayed map. If the user wants to create a workorder for a field or location that does not have a defined boundary, the user has to first identify the location of the boundaries for the corresponding field or location on the computer generated or displayed map. Once the field or location has been defined on the computer generated or displayed map, the user can then create a workorder for that field or location.

In an exemplary embodiment, a workorder can be broken down or divided into multiple jobs that are directed to specific tasks and/or areas of the selected predefined field or location depending on the number of actions or tasks to be completed and/or the size of the selected predefined field or location. If a workorder includes jobs, each job can be handled by the workorder management system in the same manner that a workorder is handled by the system.

In one exemplary embodiment, the user can enter a workorder for the taking of one or more agricultural field data samples, such as soil samples, tissue samples or nematode samples, from a predetermined field and/or location. In another exemplary embodiment, the user can enter a workorder for the application of a prescription or recommendation plan to a predetermined field and/or location. In still another exemplary embodiment, the user can enter a workorder for a chemical application or fertilizer application to a predetermined field and/or location.

After the workorder is entered into the system, the workorder can be stored or saved in the system and then wirelessly transmitted to the corresponding assigned equipment and/or people or operators to perform the required tasks set forth in the workorder (step 204). In an exemplary embodiment, if the selected equipment and/or operators are not present or located at the field or location selected by the user for the workorder, the system can also send location information along with the workorder to direct the equipment and/or operators to the proper location. In another embodiment, if the equipment and/or operators are equipped with global positioning system (GPS) devices, the GPS devices can be used to guide the equipment and/or operator to the selected field or location.

Once the workorder is received by the corresponding equipment and/or operators, the workorder is stored or saved in a computer included in or with the equipment. In one embodiment, if the workorder is sent to the operator, the operator may have to transfer the workorder to the computer included with the equipment. In another embodiment, if the workorder is sent directly to the computer included with the equipment, the operator may receive a notification, e.g., an email, text message, etc., informing the operator that the equipment computer has received a new workorder.

In an exemplary embodiment, the stored workorder in the equipment computer can be supplemented with other data stored in the equipment computer (or transferred from the operator computer) or obtained from other sources such as the Internet. For example, some of the data that can be supplemental to or integrated with the workorder can relate to map/text based navigation (to help the individual get to the job site), live chemical database lookup (to determine any relevant government regulations and worker protection information associated with the materials to be used in the workorder) and weather data (to assist with required government reporting of an application).

After the additional or supplemental information is integrated or associated with the stored workorder on the equipment computer, the necessary actions from the workorder are performed by the equipment and operator (step 206). To facilitate more accurate processing of the workorder, the equipment can include a global positioning system (GPS) device. The GPS device can provide an accurate location of where certain actions identified in the workorder were taken by the equipment and operator, e.g., the taking of a sample.

After the required actions from the workorder have been completed in accordance with the workorder, the equipment and/or operator can then wirelessly send or transmit the completed workorder and associated data or application log data (ALD) back to the system (step 208). The system stores the information returned from the equipment and/or operator with the original workorder. For example, when the piece of equipment has finished with the application of materials in accordance with a prescription workorder, the piece of equipment can wirelessly send application log data, e.g., the amount of material actually applied, and completed workorder information to the system, either based on a operator command or automatically at a predetermined time. The workorder management system then stores the application log data and completed workorder information and updates the status of the workorder. Finally, the user can access and download the workorder and application log data reports pertaining to the location and/or workorder selected by a user (step 210).

Figure 3:
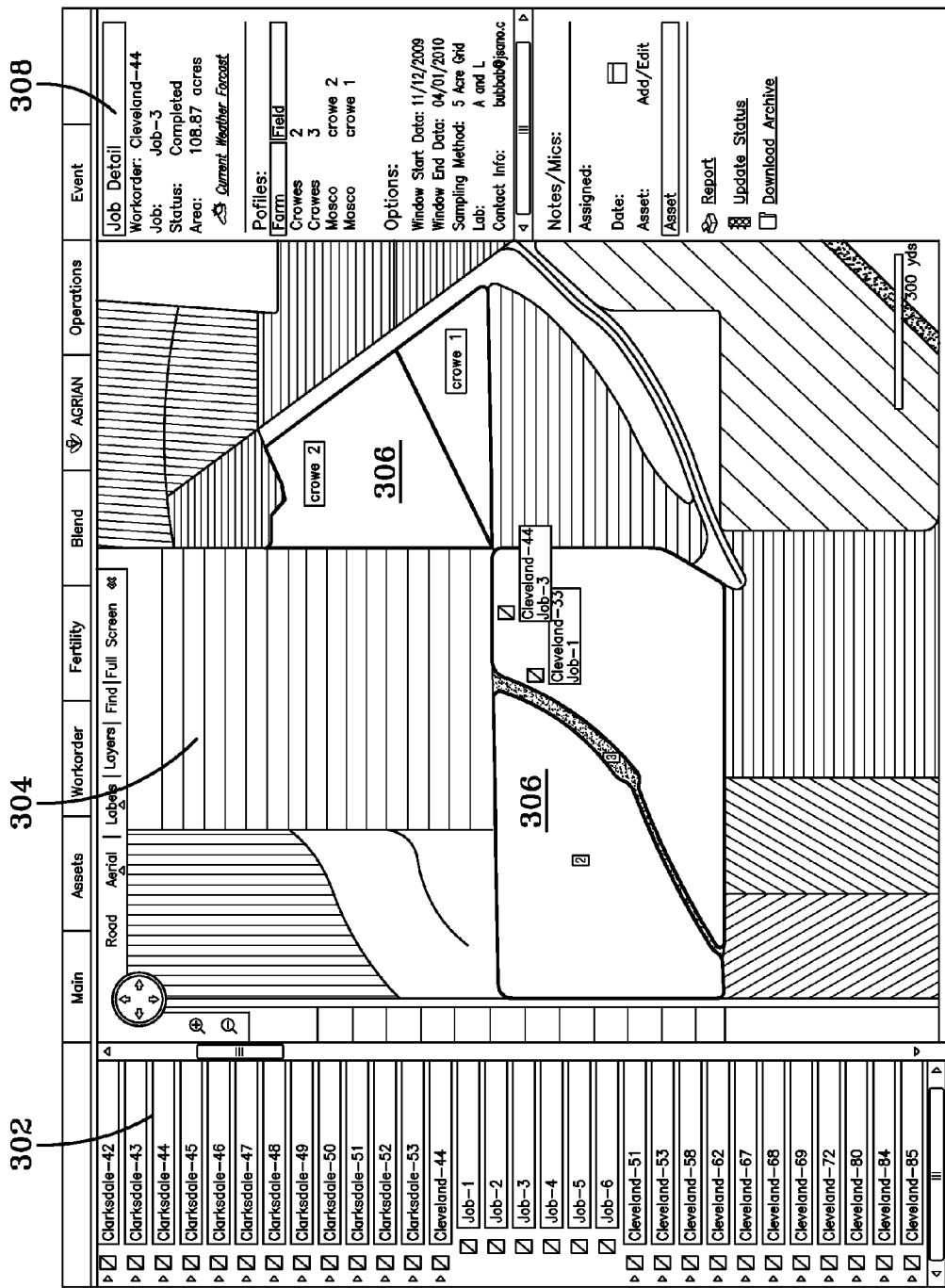
FIG. 3 shows an exemplary embodiment of a web page for the workorder management system.

FIG. 3 shows an exemplary web page, as displayed by a web browser, for the workorder management system. A web page 300 can display a list 302 of workorders created or accessible by the user. When a workorder is selected from list 302, a map 304 can be displayed and predefined fields or locations 306 can be shown with respect to the map 304. Information relating to the selected workorder can be displayed in an information field or area 308 and can provide information on the status of the workorder, the predetermined field or location 306 associated with the workorder, and other information associated with the workorder.

The workorder management system can also track the progress of the piece of equipment with respect to a particular workorder. In one exemplary embodiment, a recommendation plan or prescription workorder for a particular location can be stored in the system and then wirelessly transmitted to the corresponding equipment and/or operator at the preselected location. The prescription workorder for the piece of equipment can configure the piece of equipment to apply certain materials in certain amounts in certain areas as specified in the workorder. In addition, the workorder management system can update the status of the workorder, once the piece of equipment has started a particular workorder.

Figure 4:
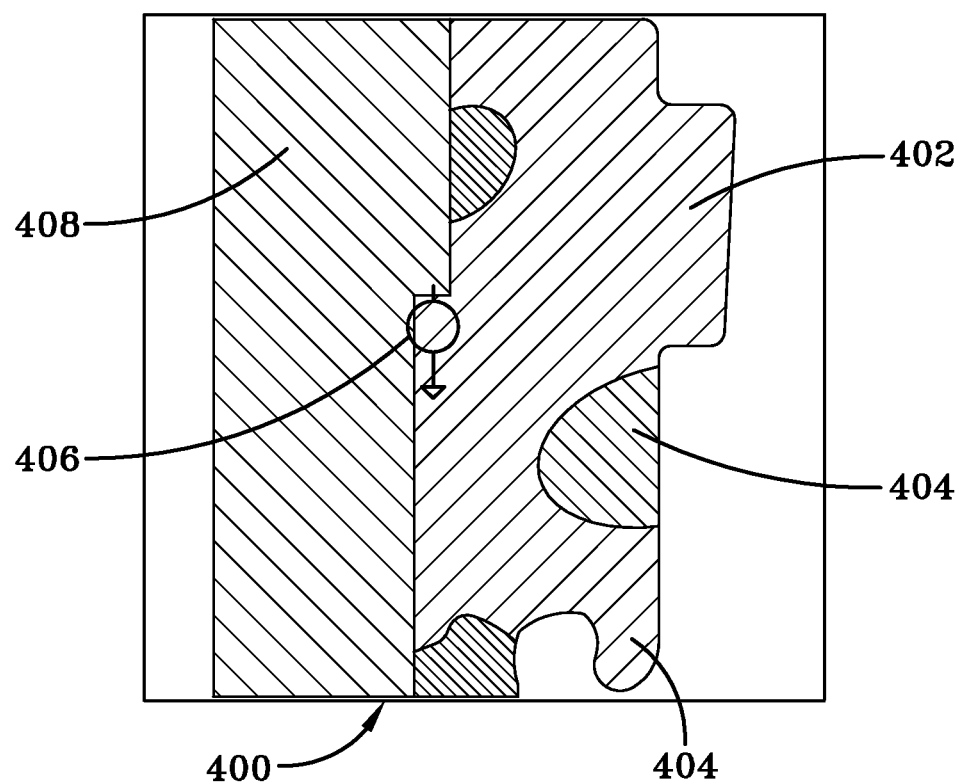
FIG. 4 shows an exemplary embodiment of a display to monitor equipment progress.

FIG. 4. shows an exemplary embodiment of the tracking of the progress of a piece of equipment relative to a prescription workorder. The progress of the piece of equipment can be shown in a web page or display 400. The display 400 can be included in a system web page displayed by the user computer, operator computer and/or the equipment computer. Alternatively, the display 400 can be included in a separate web page or included in another similar type of application. The display 400 can show the predefined field or location 402 from the workorder. The prescription plan for the predefined field or location 402 is shown with respect to the predefined field or location 402 and can include zones 404 that require different treatment options or equipment configurations. The prescription workorder can include information regarding the particular equipment setup for each of the zones 404 of the prescription plan. As the piece of equipment enters a particular zone, the information from the prescription workorder can be automatically applied to the piece of equipment to adjust the operating configuration of the piece of equipment to that required for the new zone. In another embodiment, the prescription workorder can trigger an alert for the operator to manually adjust the configuration for the piece of equipment when the equipment is approaching a new zone.

The piece of equipment can include a GPS device to determine the location of the piece of equipment relative to the predefined field or location 402. An equipment indicator 406 can be shown by the display 400 indicating the position of the piece of equipment relative to the predefined field or location 402. Further, the display 400 can show the area 408 of the predefined field or location 402 where the prescription plan has already been applied or executed, i.e., the required action or task from the workorder has been completed.

Figure 5:
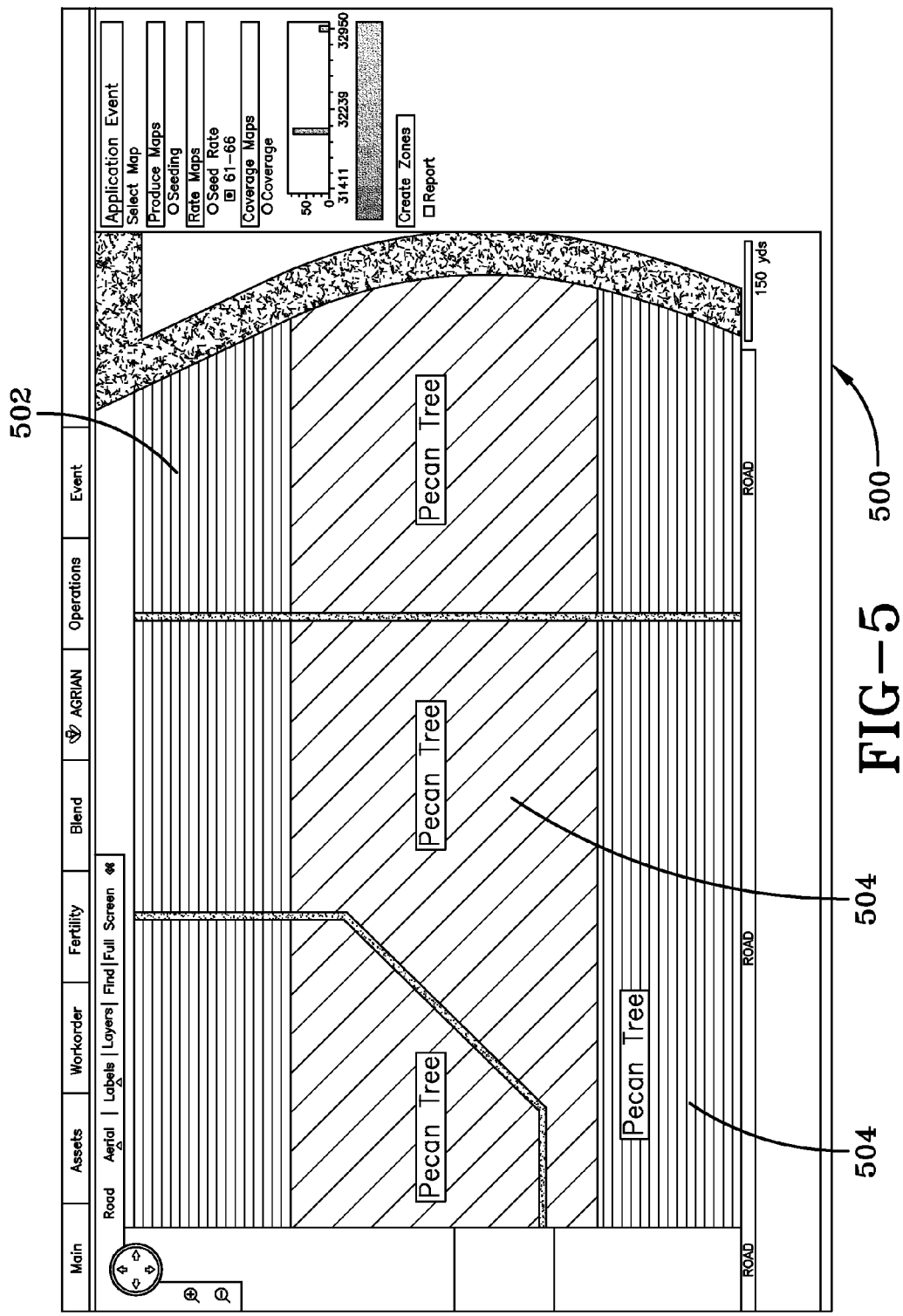
FIG. 5 shows an exemplary embodiment of a web page with application log data for a completed workorder.

FIG. 5 shows an exemplary embodiment of web page, as displayed by a web browser, with application log data associated with a workorder. A web page 500 can include the predefined field or location 502 from the corresponding workorder. The application log data for the predefined field or location 502 is shown with respect to the predefined field or location 502 and can include zones 504 where different actions were completed according to the workorder.

In one exemplary embodiment, the user can enter details such as grower details, field location, product rates and totals, associated files, e.g., information relating to the product, notes regarding the workorder, e.g., information on the field location, and contact information into a workorder. When the workorder is transmitted to the equipment computer, the operator can retrieve the provided information associated with the workorder and use the provided information in the completion of the workorder. In addition, the operator can retrieve map information associated with a workorder for review on the equipment computer.

In another exemplary embodiment, when a piece of equipment is assigned to a large area, i.e., an area having multiple predefined fields or locations, the user can transmit multiple workorders for the multiple predefined fields or locations to the piece of equipment assigned to the area. The operator of the piece of equipment can review the multiple workorders and select a workorder for completion. If the piece of equipment is not located at the predefined field or location associated with the selected workorder, the workorder management system can assist the operator and piece of equipment in reaching the predefined field or location using a GPS device. Once the piece of equipment reaches the predefined field or location, the workorder is completed in accordance with the instructions in the workorder. The operator of the piece of equipment repeats the process of selecting and completing workorders until all the workorders sent to the piece of equipment have been completed.

In an exemplary embodiment, the system can communicate with the equipment computer or the operator's computing device by any suitable wireless communication technique. For example, the system can communicate through cellular communication technology or satellite communication technology. It is to be understood that the equipment computer or the operator's computing device can incorporate the appropriate hardware, e.g., transmitters, receivers, amplifiers, etc., and/or software to enable effective communication for the wireless technology used by the system.

In one exemplary embodiment, the user computer, the operator computer and the equipment computer can include the appropriate user interfaces, monitors, displays or other associated equipment or software to enable a user or operator to interact with the workorder management system.

Embodiments within the scope of the present application include program products having machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims. It should also be understood that the phraseology and terminology employed herein is for the purpose of description only and should not be regarded as limiting.

It is important to note that the construction and arrangement of the present application as shown in the various exemplary embodiments is illustrative only. Only certain features and embodiments of the invention have been shown and described in the application and many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A system for assigning workorders to equipment having a global positioning system (GPS) device, the system comprising:

a first computer;

a second computer associated with said equipment, said second computer including a display device;

a workorder management system comprising:

a first computer algorithm executable by a microprocessor from the first computer, the first computer algorithm being configured to permit a user to create a workorder for the piece of equipment and transmit the workorder to the second computer with the piece of equipment; and a second computer algorithm executable by a microprocessor from the second computer, the second computer algorithm being configured to permit an operator to retrieve the transmitted workorder from the first computer, integrate additional information into the transmitted workorder and transmit information on the completed work order to the first computer;

a list of workorders stored on said first computer;

a list of prescriptions stored on said first computer, each said prescription relating to a geographic zone;

a list of predetermined locations stored on said first computer;

the GPS device adapted for providing positioning data of said piece of equipment to said first and second computers;

a first workorder chosen from said list of workorders by said first computer, said first workorder comprising information on at least one action to be completed by the piece of equipment and information on a first predetermined location chosen from said list of predetermined locations by said first computer, and where the piece of equipment is to perform the at least one action to be completed;

a second workorder chosen from said list of workorders by said first computer, said second workorder comprising information on at least one action to be completed by the piece of equipment and information on a second predetermined location chosen from said list of predetermined locations by said first computer, and where the piece of equipment is to perform the at least one action to be completed;

wherein said first predetermined location is located remotely from said second predetermined location;

a prescription chosen from said list of prescriptions by said first computer, said prescription applied to said equipment based upon said equipment location determined by said GPS device;

a map displayed by said display device, said map showing generally the location of said equipment in relation to said first and second predetermined locations, and showing an outline of the zone associated with said prescription;

wherein the at least one action to be completed comprises at least one of an action to take one or more agricultural field data samples from the predetermined location, and action to apply a prescription to the predetermined location or an action for a chemical application or fertilizer application to the predetermined location;

wherein said map is updated based upon said action; and wherein said first computer updates said list of workorders, said list of prescriptions, and said list of predetermined locations based upon the updates applied to said map.

2. The system of claim 1 wherein the workorder comprises a plurality of jobs having a plurality of actions for a predetermined location, each job of the plurality of jobs relating to at least one of a different action of the plurality of actions or a different area of the predetermined location from the other jobs of the plurality of jobs.

3. The system of claim 1 wherein the transmitted information on the completed workorder includes an indication that the workorder has been completed and log data collected during completion of the workorder.

4. The system of claim 1, wherein the second computer algorithm is configured to transmit information relating to a partial completion of the transmitted workorder by the piece of equipment to the first computer.

5. The system of claim 1, further comprising:
a third computer associated with a second piece of equipment, said third computer including a second display device and a GPS device;
a third workorder chosen from said list of workorders by said first computer, said third workorder comprising information on at least one action to be completed by the second piece of equipment and information on a third predetermined location chosen from said list of predetermined locations by said first computer, and where the piece of equipment is to perform the at least one action to be completed;
wherein said third predetermined location is remote to each of said first and second predetermined locations;
a second prescription chosen from said list of prescriptions by said first computer, said second prescription applied to said second equipment based upon said second equipment location determined by said GPS device;
a second map displayed by said second display device, said second map showing generally the location of said second equipment in relation to said third predetermined location, and showing an outline of the zone associated with said second prescription;

wherein the at least one action to be completed comprises at least one of an action to take one or more agricultural field data samples from the predetermined location, an action to apply said second prescription to the third predetermined location or an action for a chemical application or fertilizer application to the third predetermined location;

wherein said second map is updated based upon said action; and wherein said first computer updates said list of workorders, said list of prescriptions, and said list of predetermined locations based upon the updates applied to said second map.

6. The system of claim 1, wherein said agricultural field data samples include at least one of soil samples, tissue samples or nematode samples.

7. A method for assigning work orders to vehicles, the method comprising the steps:
providing a first computer;
providing a piece of equipment at a remote location from the first computer, the piece of equipment comprising a second computer and a global positioning system (GPS) device;
combining the analysis information with the stored log data for the collected plurality of samples with the computer;
generating a list of predetermined locations;
generating a list of workorders for each of said list of predetermined locations with said first computer, each workorder including at least one action to collect a plurality of samples at the predetermined location;
preparing a prescription plan for each of said predetermined locations;
selecting a first predetermined location from said list of predetermined locations with said first computer;
transmitting the prescription plan to the predetermined piece of equipment based upon said first predetermined location;
selecting a second predetermined location from said list of predetermined locations with said first computer;
transmitting a first prescription plan to the predetermined piece of equipment based upon said first predetermined location;
transmitting a second prescription plan to the predetermined piece of equipment based upon said second predetermined location;
storing application data associated with the applied first and second prescription plans at said second computer;
transmitting a first workorder associated with said first predetermined location from said first computer to said second computer, including providing directions to the first predetermined location;
transmitting a second workorder associated with said second predetermined location from said first computer to said second computer, including providing directions to the first predetermined location;
applying the first prescription plan to the first predetermined location comprises monitoring a status of the predetermined piece of equipment with said first computer and monitoring the prescription plan with said second computer;
displaying the first prescription plan for the first predetermined location on a map via a display device associated with said second computer;

displaying the location of said equipment relative to said first predetermined location on said map;

performing said first workorder at said first predetermined location, wherein said first workorder includes at least the step of collecting at least one of soil samples, tissue samples or nematode samples;

storing log data associated with the collected plurality of samples of said first workorder;

transmitting the stored log data on the collected plurality of samples of said first workorder to said first computer;

analyzing said stored log data of said first workorder with said first computer;

updating said list of predetermined locations, said list of workorders, and each of said prescriptions for each of said predetermined locations based upon the analysis of said stored log data of said first workorder;

applying the second prescription plan to the second predetermined location comprises monitoring a status of the predetermined piece of equipment with said first computer and monitoring the second prescription plan with said second computer;

displaying the second prescription plan for the second predetermined location on said map via a display device associated with said second computer;

displaying the location of said equipment relative to said second predetermined location on said map;

performing said second workorder at said second predetermined location, wherein said second workorder includes at least the step of collecting at least one of soil samples, tissue samples or nematode samples;

storing log data associated with the collected plurality of samples of said second workorder;

transmitting the stored log data on the collected plurality of samples of said second workorder to said first computer;

analyzing said stored log data of said second workorder with said first computer; and updating said list of predetermined locations, said list of workorders, and each of said prescriptions for each of said predetermined locations based upon the analysis of said stored log data of said second workorder.

* * * * *